United States Patent [19]

Bertl

[11] 4,418,376
[45] Nov. 29, 1983

[54] DISC TRIMMER

[75] Inventor: Gerd Bertl, Röthenbach, Fed. Rep. of Germany

[73] Assignee: Stettner & Co., Lauf, Fed. Rep. of Germany

[21] Appl. No.: 437,041

[22] Filed: Oct. 27, 1982

[30] Foreign Application Priority Data

Oct. 28, 1981 [DE] Fed. Rep. of Germany ....... 3142671

[51] Int. Cl.³ .............................................. H01G 5/06
[52] U.S. Cl. .................................................. 361/293
[58] Field of Search ....................... 361/292, 293, 287

[56] References Cited

U.S. PATENT DOCUMENTS

| 3,244,951 | 4/1966 | Wallace | 361/293 |
| 3,883,937 | 5/1975 | Alexander et al. | 361/293 X |
| 4,181,923 | 1/1980 | Tatsumi et al. | 361/293 |
| 4,253,133 | 2/1981 | Yoshimoto | 361/293 |

*Primary Examiner*—Donald A. Griffin
*Attorney, Agent, or Firm*—Jordan and Hamburg

[57] ABSTRACT

A disc trimmer has two circular-like segmented condenser plates which can be rotated relative to each other. The disc trimmer has an optimally low initial capacitance, which is independent of the final capacitance, and this is achieved by forming a dielectric corresponding to the shape of at least one plate circular-like and connecting it to a plate in a way that they approximately cover each other.

9 Claims, 13 Drawing Figures

DISC TRIMMER

BACKGROUND OF THE INVENTION

This invention relates to a disc trimmer with two circularlike segmented condenser plates, which can be rotated relative to each other and between which is arranged a dielectric.

Such disc trimmers serve as a variable capacitor, whereby the maximum capacitance is reached when the condenser plates are arranged in a covering or overlapping fashion on top of each other, and the minimal capacitance corresponds with the turned position of the condenser plates.

In the known disc trimmers, the dielectric is formed as a layer which may, for instance, be circular and which covers the entire working area. Hereby significant initial capacitances develop even in the turned position of the condenser plates which are undesirable for many ranges of application. These initial capacitances depend on the final capacitances, which are to be achieved with the corresponding disc trimmer.

The invention has an objective to provide a disc trimmer in such a way that the initial capacitance is very low and virtually independent of the final capacitance.

This objective is achieved by a disc trimmer of the type mentioned initially in which the dielectric is approximately circular, corresponding with the shape of the plates and connected to one plate, approximately covering each other.

This arrangement eliminates the placing of a dielectric between the condenser plates even in the peripheral area in the initial or minimal position which would lead to a larger initial capacitance. At the same time, this makes the initial capacitance to a large extent independent of the final capacitance, since this is not or only minimally influenced by the thickness of the dielectric.

The invention further provides that the dielectric has an electrically conducting layer which serves as a plate. Such a layer can be applied to the dielectric, for instance, by evaporation or electrolytically. In this connection, ceramic can serve as the dielectric, while for instance silver can be used for the conducting layer.

It is advantageous if the coated dielectric is located in an opening of the supporting structure. Thus it is assured that even in very thin covering layers of the dielectric, for instance 0.1 mm, that the combination dielectric-condenser plate can be arranged and handled in the disc trimmer without the danger of mechanical damage. The connection between the dielectric and the supporting structure can be achieved by means of an adhesive.

It is of particular advantage if the surfaces of the dielectric and supporting structure facing the respective other plate are aligned. This can be achieved by grinding or polishing both together after having glued the dielectric to the supporting structure.

It is particularly favorable if the supporting structure is manufactured of synthetic material, which is unaffected by temperature changes and has a low dielectric constant such as a duroplast, e.g. an unsaturated polyester material. The low dielectric constant of the supporting structure also leads towards a possibly low initial capacitance and accordingly also towards an increased range of adjustment.

In the invention, the supporting structure is formed as a cylindrical rotor which receives an adjustment device.

Another embodiment of the invention provides that the supporting structure is formed as a stator carrying the rotor.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and operation of the invention, however, together with additional objects and advantages thereof will be best understood from the following description of specific embodiments when read in connection with the accompanying drawings.

DESCRIPTION OF THE PREFERRED EMBODIMENTS

Figure 1:
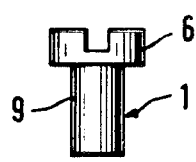
FIG. 1 is a side view of the adjustment device.
Figure 6:
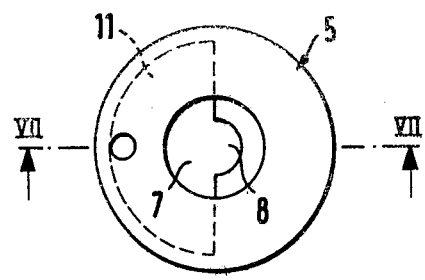
FIG. 6 is a top view of the supporting structure.
Figure 2:
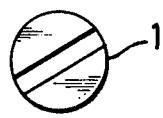
FIG. 2 is a top view of the adjustment device.
Figure 7:
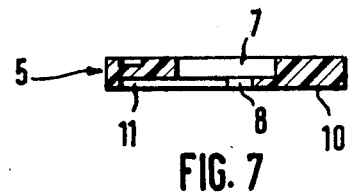
FIG. 7 is a cross sectional view taken along line VII—VII in FIG. 6.
Figure 3:
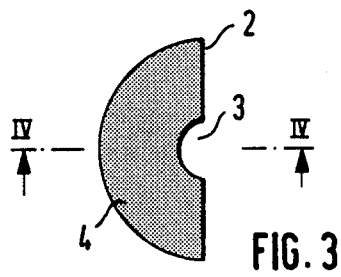
FIG. 3 is a top view of the coated dielectric.

FIGS. 1 and 2 show an adjusting device 1 which is formed as a type of slotted head screw. A dielectric number 2 is circularly formed in a way that it represents half of a circle such as a protractor and is provided with an opening in the middle to receive the adjusting device 1. The dielectric 2 has a silver layer on one side whereby this silver layer serves as a condenser plate 4. Dielectric 2 itself is made from ceramic.

Figure 8:
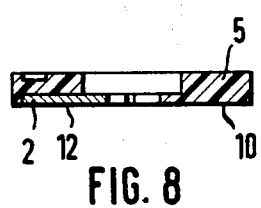
FIG. 8 is a view corresponding to FIG. 7 but showing the inserted dielectric.
Figure 4:
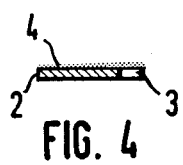
FIG. 4 is a cross sectional view taken along line IV—IV in FIG. 3.
Figure 9:
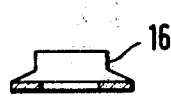
FIG. 9 is a cross sectional view of a leaf spring.

A supporting structure 5 receives dielectric 2. The supporting structure 5 has a bottom hole receiving the head 6 of adjusting device 1 and a bore hole 8 receiving the shank 9 of adjusting device 1. On the underside 10 of the supporting structure 5, there is located an opening 11 which corresponds in form and thickness to dielectric 2. Dielectric 2 is glued in, as shown in FIG. 8, whereby the underside 10 of the supporting structure 5 is ground or polished together with underside 12 of dielectric 2 in such a way that an aligned joint with a planar joint underside 10, 12 is produced.

In the embodiment shown in FIGS. 1-10, supporting structure 5 serves as the rotor. The supporting structure 5 is manufactured from a synthetic material unaffected by temperature changes and which further has a low dielectric constant.

Figure 5:
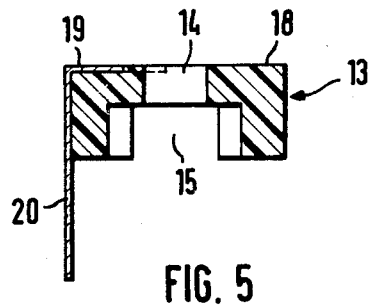
FIG. 5 is a cross sectional view of the stator.
Figure 10:
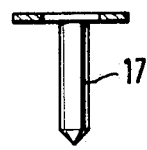
FIG. 10 is a partial cross sectional view of the rotor connection.

A stator 13 as shown in FIG. 5 has a bore hole 14 to receive the shank 9 of adjustment device 1. Bore hole 14 is enlarged downwardly to form a bore hole 15 in which a spring arrangement 16 and a rotor connecting part 17 are disposed.

On the upper side 18 of stator 13 the second condenser plate 19 is embedded in an aligned fashion and is connected to the electrical connection 20. Stator 13 may be manufactured from the same synthetic material as supporting structure 5.

Rotor connecting part 17 is connected to the first condenser plate 4, that is, the silver layer of dielectric 2. This can be achieved, for instance, by manufacturing adjustment device 1 from conducting material and connecting it by means of a conducting adhesive to the silver layer on dielectric 2.

Figure 11:
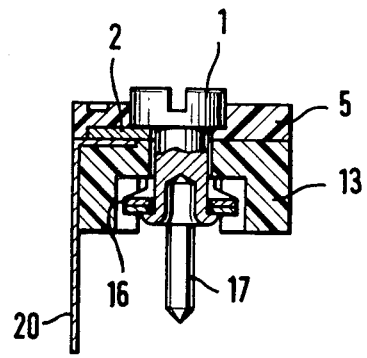
FIG. 11 is a cross sectional view through a disc trimmer according to the invention as in the first embodiment utilizing the components shown in FIGS. 1-10.

As can be seen in FIG. 11, there is no conducting connection between the supporting structure 5 forming the rotor and stator 13.

Figure 12:
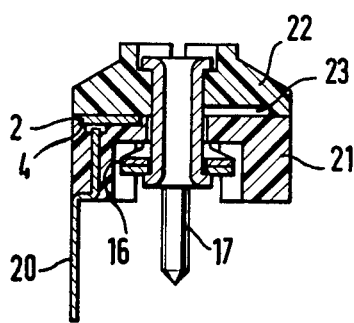
FIG. 12 is a cross sectional view of another embodiment of a disc trimmer according to the invention.
Figure 13:
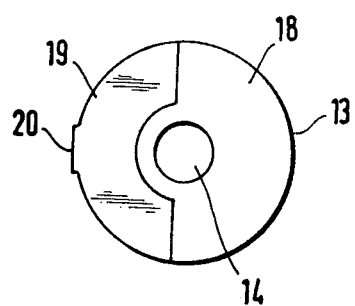
FIG. 13 is a top view of the stator.

In a second embodiment shown in FIG. 12, dielectric 2 is located in stator 21 which serves as a supporting structure for the same. The surface of dielectric 2, which faces downwardly and which is not shown in detail, is silver-coated. The area of dielectric 2 which faces upwardly is aligned with the surface of stator 21. Dielectric 2 thereby has the form shown in FIG. 3 and is connected with stator 21 by means of glueing.

Rotor 22 is connected with the stator analogous to that shown in FIG. 11. However, in this case, the rotor is made of metal. Its underside is planar and parallel to the upper side of stator 21. The underside has an opening 23 which takes up approximately half its size and which can be changed in its position towards dielectric 2 by means of the adjustment device. In this embodiment, the silver layer of dielectric 2 serves as one condenser plate and metallic rotor 22 serves as the second condenser plate.

In both embodiments of the invention, the form of the dielectric enables a low initial capacitance, which is desirable, especially in microwave applications and generally in works with higher frequencies. In addition, an especially large range of adjustment is achieved in the embodiment of FIGS. 1 to 11 by means of a low initial capacitance which is independent from the final capacitance. While, for instance in traditional disc trimmers, at a final capacitance of 3 pF, the initial capacitance was 1 pF, it is possible, according to the present invention, to lower the initial capacitance to a value of about 0.7 pF, independent of the final capacitance.

In the embodiment according to FIG. 12, dielectric 2 is positioned in an especially break-resistance manner and can accordingly be ground very thin.

What I claim is:

1. A disc trimmer comprising two segmented circular condenser plates, a dielectric member disposed between said two plates, and means for effecting relative rotations between said two plates, said dielectric member having a segmented circular configuration conforming to the segmented circular configuration of one of said plates with said one plate being formed as a covering on said dielectric member.

2. A disc trimmer according to claim 1, wherein said dielectric member has an electrically conducting layer thereon which forms said one plate.

3. A disc trimmer according to claim 2 further comprising a supporting structure having an opening in which said dielectric member with its conducting layer is mounted.

4. A disc trimmer according to claim 3, wherein said supporting structure has a planar surface, said dielectric member having an inner surface and an outer surface, said inner surface having said electrically conducting layer thereon, said outer surface being aligned with said planar surface of said support structure, said planar surface of said support structure facing the other segmented circular condenser plate.

5. A disc trimmer according to claim 3, wherein said supporting structure is made from a synthetic material which is unaffected by temperature changes and which has a low dielectric constant.

6. A disc trimmer according to claim 3, wherein said supporting structure is formed as a circular rotor which receives an adjusting device.

7. A disc trimmer according to claim 3, wherein said supporting structure is formed as a stator which mounts a rotor.

8. A disc trimmer according to claim 3, wherein said opening in said supporting structure has a configuration corresponding to that of said dielectric member.

9. A disc trimmer according to claim 1, wherein said dielectric member has a generally semi-circular configuration.

* * * * *